UNITED STATES PATENT OFFICE.

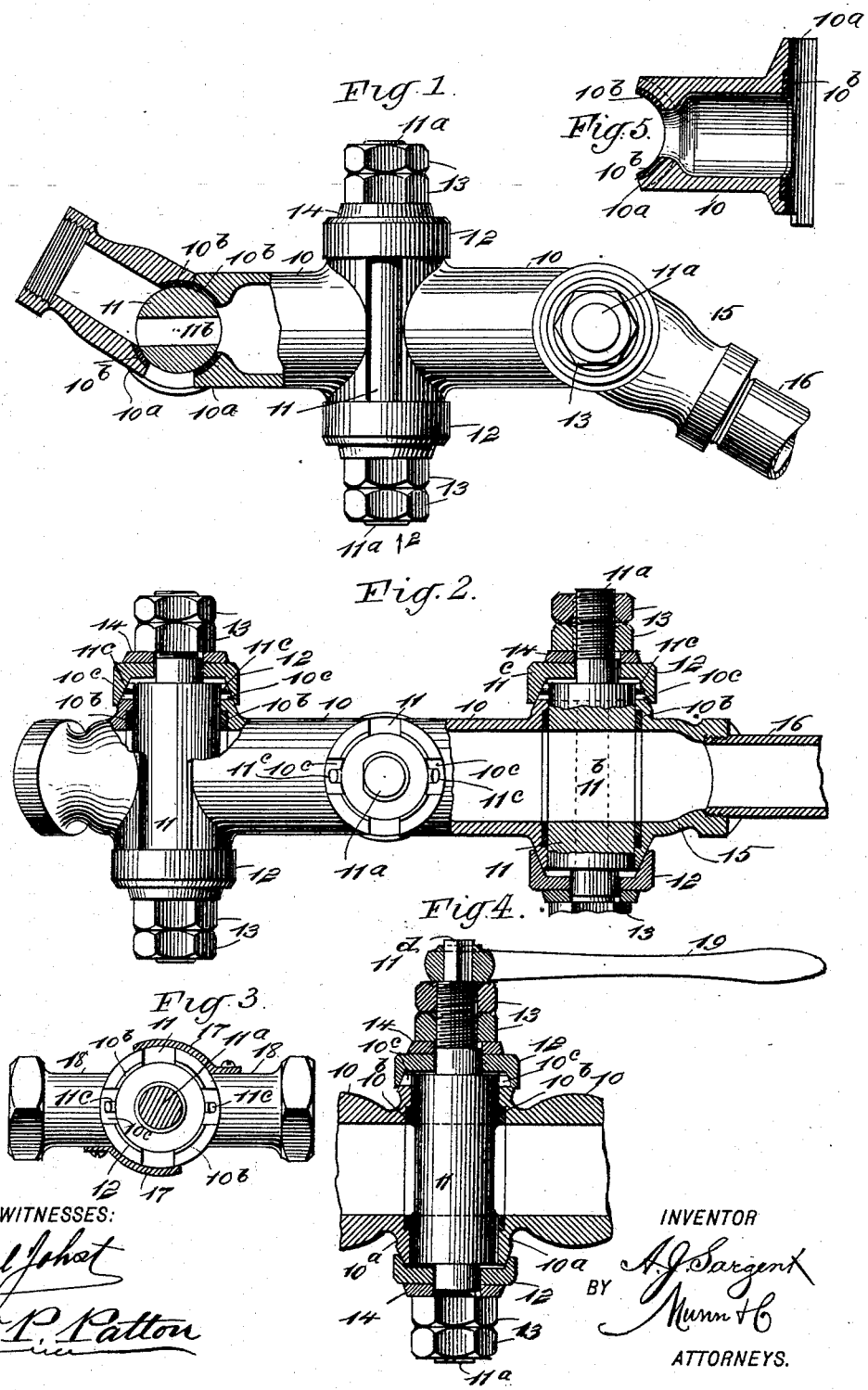

ALBERT J. SARGENT, OF WILKINSBURG, PENNSYLVANIA.

FLEXIBLE PIPE-JOINT.

SPECIFICATION forming part of Letters Patent No. 524,613, dated August 14, 1894.

Application filed April 6, 1894. Serial No. 506,589. (No model.)

*To all whom it may concern:*

Be it known that I, ALBERT J. SARGENT, of Wilkinsburg, in the county of Allegheny and State of Pennsylvania, have invented a new and useful Improved Flexible Pipe-Joint, of which the following is a full, clear, and exact description.

My invention relates to improvements in flexing joints for metal pipes, and has for its object to provide a metal pipe joint which will permit a limited flexing movement to be produced in the joint, and afford a continuous passage of ample dimensions through a line of pipe having a plurality of said joints, said passage being substantially axial, avoiding abrupt bends or offsets, and thereby affording a flexible metal pipe, that is adapted to deliver fluids or gas under pressure, with a minimum reduction of volume and force.

To these ends, my invention consists in the construction and combination of parts, as is hereinafter described and claimed.

Reference is to be had to the accompanying drawings, forming a part of this specification, in which similar figures of reference indicate corresponding parts in all the views shown.

Figure 1 is a partly sectional side view of the improvement shown in triplicate, indicating the construction of a flexible pipe in part. Fig. 2 is a partly sectional side view of the joints represented in Fig. 1, taken in the direction of the arrow 2, in Fig. 1. Fig. 3 is a partly sectional side view of one of the flexing joints, showing an additional feature of improvement. Fig. 4 is a sectional side view of a stop cock in part, having features of the improvement; and Fig. 5 is a sectional side view of a part of the improvement, which is a principal element in the construction of the novel flexible joint.

The main cylindrical shell 10, is formed of any suitable metal, having a correct length to adapt it for effective service, and shaped at the ends as shown, said end-portions being similar, each comprising an integral projection at opposite points on the end of the cylindrical part, and incurved on their transverse outer faces, so as to produce opposite aligned curved flanges, that are intermediately joined, thereby affording at each end of the swing joint section 10 a like cylindric segment 10ª.

The joint sections 10 are duplicated to produce a swinging joint of the improved style, and have their portions 10ª cone tapered at their ends on their outer faces, the transverse dimensions of these similar end portions being less than the diameter of the circles of which their incurved faces are segments.

As shown in Figs. 1, 2 and 5, the segmental cylindric end portions of each joint section 10 are formed in planes at right angles to each other, and furthermore, that their bores, of considerable diameter, are laterally reduced to produce elongated apertures at their ends, which latter conform in direction with the planes of the segmental ends they perforate.

There is a true cylindrical plug piece 11 provided, which is of such a diameter that the segmental cylindric end portions 10ª of the joint sections 10 will closely fit on its exterior surface. To readily produce a tight joint between the parts 10, 10 and 11, the joint sections 10 have soft metal lining pieces 10ᵇ, introduced within suitable recesses formed in the incurved faces of the segmental cylindric end portions 10ª, which linings may be easily ground, scraped or otherwise fitted on the plug body, so as to produce a steam, gas or liquid tight joint therewith. The plug body proper is about equal in length with the length of the incurved walls of the segmental ends 10ª, and at each end said plug is reduced and extended sufficiently to permit the formation of similar integral bolt ends 11ª. One side of each end 11ª is cut away to flatten it equally from end to end, and on the part of each bolt end that is nearest to the cylindrical main portion of the plug, the centrally perforated and conically-dished similar cap pieces 12 are fitted, to conform with the flattened and cylindrical portions of the bolt ends so as to be adapted to slide freely without rotation independent of the bolt heads. The bolt ends 11ª are further reduced outside of the cap pieces 12, and threaded on these reduced parts for the reception of the nuts 13, which in pairs are screwed on each bolt end, one nut jamming the other of each pair, which will permit a proper adjustment of the same and prevent their accidental displacement.

Preferably a washer 14 is placed on each bolt end $11^a$ between the inner nut and the cap piece 12, the central perforation of the washers being shaped to produce a fit on the flattened parts of the bolt ends when slid on them, thereby restraining the washers from rotation independent of the bolt heads.

The cylindrical body of the plug 11 is transversely apertured through the axis, as at $11^b$, of a length equal to that of the cylindric segmental ends $10^a$ on the joint sections 10, the elongated perforations in the latter having a greater width than is given to the aperture in the plug body, as indicated in Fig. 1 at the left side of said view.

At the center of width of each segmental portion $10^a$ on the ends that lie opposite when parts of the swing joint are assembled, there is a rectangular notch $10^c$ cut in said taper walled ends, these notches being equal in depth and width, the latter named dimension being nearly the same as the width afforded to the transverse aperture or slot in the plug body 11.

It will be evident that when the parts of the flexing joint that have been described, are relatively located as explained, the lateral flexure of each joint section 10 will be permitted, and a through passage afforded which is always equal in area to the dimensions given to the transverse slot in the plug body 11.

The normal separation of the side edges of the cylindric segmental ends $10^a$ permits a rocking movement to be given to each joint section, about equal in extent to the width afforded to the notches $10^c$ and the check studs $11^e$, that project into these notches from opposite points on the plug body and co-act to determine the degree of lateral vibration which may be given to the joint sections 10. The two remaining ends of the coupled joint sections 10 are also furnished with plugs, cappieces and nuts, similar in form to those that have been described, and as it is intended to utilize three of the flexing joints in near relation, so as to afford a flexing movement in planes at right angles to each other, and connect a series of these joints by pipe nipples, an outer end joint section 15 is furnished for the completion of each flexing triple joint, said end pieces being represented in Figs. 1 and 2 of the drawings.

It will be seen that the similar end sections 15, each consists of a tubular metal piece having one end furnished with a cylindric segmental portion similar to the end portions $10^a$, so that a flexing connection of these end sections may be effected in conjunction with the ends of the joint pieces 10 by employment of the cap-pieces 12, washers 14 and nuts 13, along with the plugs 11, as before explained, the outer extremities of the end sections 15, having each a suitable thread internally formed for the reception of a pipe nipple such as is indicated in part at 16 in Figs. 1 and 2, said nipples being made of any desired length, so as to provide a flexing metallic pipe that will yield sufficiently for all practical purposes. The device shown in Fig. 3 is constructed substantially similar to the central swing-joint represented in Figs. 1 and 2, the essential additional feature of importance comprising the guard plates 17, that are attached by one end of each on the outer surface of the joint sections 18, the latter being shaped externally as shown, so as to permit the curved faces of the guard plates to have a sliding contact with said surfaces, which will adapt the plates 17 to protect the openings between the joint sections and prevent the entrance of dirt in these openings, which in some cases is essential for the preservation of the cylindrical plug and parts engaging it, from the abrasive action of gritty sand or other like material.

In Fig. 4, a stop cock is shown, which is composed of two joint sections having the segmental end portions $10^a$, the plug 11, cappieces 12, washers 14 and nuts 13, all arranged in the same relation to each other as has been described with regard to the central flexing joint shown in Figs. 1 and 2. The changes made to adapt said parts to serve as a stop cock, consist in the extension of one threaded bolt end $11^d$ on the plug body and fitting a handle piece 19 on said end, the latter being preferably made square in cross section to facilitate the action of the handle, and allow it to be quickly removed when not in service, the studs $11^c$ and notches they occupy being dispensed with in the stop cock, so as to permit the plug to be turned sufficiently to close the passage in the joint sections in an obvious manner.

The improved flexing joint connection that is hereinbefore described, can be quickly and cheaply produced by usual methods of construction for light castings, and will serve a useful purpose for the transmission of steam, gas, water or any other fluid it is desired to convey from a source of supply in various directions, it being capable of production in any desired lengths to suit the service required.

It is evident that the plug 11 may be tapered if desired, and act effectively, and that in case two pieces of hollow or solid rod material are to be jointed together, the improved device may be employed as a knuckle joint for such a purpose.

Having thus fully described my invention, I claim as new and desire to secure by Letters Patent—

1. In a flexing pipe joint, the combination, with two tubular joint sections having incurved segmental ends, and a round bodied and transversely perforated plug having reduced threaded extensions on which plug the joint sections are fitted, of two clamping cap pieces and compression nuts on the threaded extensions of the plug, substantially as described.

2. In a flexing pipe joint, the combination, with two tubular joint sections, having cylindrical segmental end portions that are tapered exteriorly at ends, of a perforated round bodied plug adapted to close joint with and space apart the incurved ends of the joint sections, and having its end portions reduced and threaded, two dished cap pieces engaging the plug end portions and seated on the segmental ends of the joint sections, and compression nuts on the plug end portions adapted to press the cap pieces, substantially as described.

3. In a flexing pipe joint, the combination, with two similar tubular joint sections, each having spaced cylindric segmental ends, notched at similar terminals, of a transversely slotted cylindrical plug having reduced threaded bolt end extensions, studs projecting from the plug into the notches in the joint sections, cap-pieces adapted to compress the spaced end portions of the joint sections on the plug, and compression nuts on the extensions of the plug, substantially as described.

4. In a flexing pipe joint, the combination with two similar tubular joint sections, each having cylindric segmental end portions, set at right angles to each other in pairs and notched on corresponding ends, of a transversely-slotted cylindrical plug having reduced threaded extensions at the ends and adapted to space apart the joint sections, studs on opposite sides of the plug, entering the notches in the pipe sections, dished cap-pieces slidable on the reduced threaded bolt ends of the plug, and engaging the coniform ends of the segmental portions of the pipe sections, and compression nuts on the bolt ends of the plug, substantially as described.

5. In a flexing pipe joint, the combination with two similar tubular joint sections, each having transverse cylindric segmental end portions disposed in pairs at right angles to each other, two of said ends having notches oppositely arranged therein, of transversely-slotted cylindrical plugs each having reduced threaded end portions, cap-pieces therefor, compression nuts adapted to engage threaded end portions of the plugs, and tubular end sections, each having a cylindric segmental transverse end portion and a threaded extremity, substantially as described.

ALBERT J. SARGENT.

Witnesses:
JOHN MCWILLIAMS,
JAMES T. PROCTOR.